(12) United States Patent
Rodenhouse et al.

(10) Patent No.: US 9,890,807 B1
(45) Date of Patent: Feb. 13, 2018

(54) IMPALING WASHER FOR BUILDING CONSTRUCTION

(71) Applicant: Rodenhouse, Inc., Grand Rapids, MI (US)

(72) Inventors: Robert H. Rodenhouse, Grand Rapids, MI (US); Jason R. Wigboldy, Grand Rapids, MI (US)

(73) Assignee: Rodenhouse, Inc., Grand Rapids, MI (US)

( * ) Notice: Subject to any disclaimer, the term of this patent is extended or adjusted under 35 U.S.C. 154(b) by 0 days.

(21) Appl. No.: 15/299,968

(22) Filed: Oct. 21, 2016

Related U.S. Application Data

(60) Provisional application No. 62/244,470, filed on Oct. 21, 2015.

(51) Int. Cl.
*E04B 1/76* (2006.01)
*F16B 43/00* (2006.01)
*F16B 15/00* (2006.01)

(52) U.S. Cl.
CPC .......... *F16B 43/001* (2013.01); *E04B 1/7629* (2013.01); *F16B 15/00* (2013.01)

(58) Field of Classification Search
CPC ...... E04B 1/7666; E04B 1/762; E04B 1/7675; E04B 1/7637; E04B 1/7616; E04B 1/7629; E04B 1/7633; F16B 43/00; F16B 43/001; F16B 43/003; F16B 2043/008; F16B 15/00; F16B 15/0007; F16B 2015/0069
USPC ........ 52/404.5, 407.4, 404.2, 634, 368, 369, 52/370, 376
See application file for complete search history.

(56) References Cited

U.S. PATENT DOCUMENTS

| D32,793 S | 6/1900 | Fauber |
| 3,069,919 A | 12/1962 | Schultz, Jr. |
| 4,102,239 A | 7/1978 | Dallas |
| 4,114,597 A | 9/1978 | Erb |

(Continued)

FOREIGN PATENT DOCUMENTS

DE 102007026733 A1 12/2008

OTHER PUBLICATIONS

Brochure disclosing 2" diameter Plasti-Grip® PBLP2 washer distributed by Rodenhouse Inc. more than one year prior to Sep. 6, 2012.

(Continued)

*Primary Examiner* — Jessica Laux
(74) *Attorney, Agent, or Firm* — Gardner, Linn, Burkhart & Flory, LLP

(57) ABSTRACT

An impaling washer is provided for use in building construction. The impaling washer includes a sealing body having an aperture that is configured to receive a fastener. The fastener penetrates a membrane covering a wall and secures the sealing body to the wall. The sealing body includes an inner surface portion surrounding the aperture that seals against an outer surface of the membrane. At least one impaler extends from an outer side of the sealing body and away from the wall. The impaler is configured to engage a thermally-insulating material and hold the thermally-insulating material at the outer side of the sealing body. A thickness of the sealing body thereby forms a gap between the thermally-insulating material and the outer surface of the membrane for air insulation and drainage along the outer surface of the membrane.

19 Claims, 17 Drawing Sheets

(56) References Cited

U.S. PATENT DOCUMENTS

| | | |
|---|---|---|
| 4,292,876 A | 10/1981 | De Graan |
| 4,793,757 A | 12/1988 | Peterson |
| 4,959,938 A | 10/1990 | De Caro |
| 5,079,055 A | 1/1992 | Doyle |
| 5,419,666 A | 5/1995 | Best |
| 5,423,858 A | 6/1995 | Bolanos et al. |
| 5,517,883 A | 5/1996 | Goldi et al. |
| 5,541,377 A | 7/1996 | Stuhlmacher |
| 5,803,693 A | 9/1998 | Choiniere et al. |
| 5,833,422 A | 11/1998 | Haga et al. |
| D410,869 S | 6/1999 | Singer |
| 6,039,525 A | 3/2000 | Johnson |
| 6,231,063 B1 | 5/2001 | Chi |
| D482,270 S | 11/2003 | Derilo |
| 6,665,991 B2 | 12/2003 | Hasan |
| D517,404 S | 3/2006 | Schulter |
| 7,090,455 B2 | 8/2006 | Lamb |
| D549,091 S | 8/2007 | McIntyre et al. |
| 7,415,803 B2 | 8/2008 | Bronner |
| D576,480 S | 9/2008 | Vakiener et al. |
| D596,934 S | 7/2009 | Vakiener et al. |
| D634,248 S | 3/2011 | Chen |
| 7,896,380 B2 | 3/2011 | Tange |
| D644,921 S | 9/2011 | Hsu et al. |
| D645,337 S | 9/2011 | Hsu et al. |
| D660,691 S | 5/2012 | Yamazaki |
| D663,243 S | 7/2012 | Li |
| 8,336,275 B2 | 12/2012 | Rodenhouse |
| D679,169 S | 4/2013 | Else |
| D679,572 S | 4/2013 | Attaway |
| 8,413,740 B2 | 4/2013 | Rodenhouse |
| D682,666 S * | 5/2013 | Wigboldy ............... D8/399 |
| D696,930 S * | 1/2014 | Rodenhouse ............ D8/399 |
| D696,931 S * | 1/2014 | Rodenhouse ............ D8/399 |
| D696,932 S * | 1/2014 | Rodenhouse ............ D8/399 |
| 9,140,001 B1 * | 9/2015 | Hohmann, Jr. ....... E04B 1/4178 |
| D744,799 S | 12/2015 | Rodenhouse et al. |
| D748,973 S | 2/2016 | Rodenhouse et al. |
| D749,941 S | 2/2016 | Rodenhouse et al. |
| 9,309,915 B1 | 4/2016 | Rodenhouse et al. |
| D755,622 S | 5/2016 | Rodenhouse et al. |
| 2004/0060723 A1 | 4/2004 | Pallapothu |
| 2004/0084099 A1 | 5/2004 | Miura |
| 2006/0171794 A1 | 8/2006 | Ordonio, Jr. et al. |
| 2008/0310932 A1 | 12/2008 | McIntyre et al. |
| 2010/0019014 A1 | 1/2010 | Rodenhouse |
| 2015/0240858 A1 * | 8/2015 | Bertovic ............ B25B 13/50 411/388 |

OTHER PUBLICATIONS

Brochure disclosing 1-¾" diameter Plasti-Grip® CBW washer distributed by Rodenhouse Inc. more than one year prior to Sep. 6, 2012.
Brochure disclosing 1-¾" diameter Grip-Plate® Tab washer distributed by Rodenhouse Inc. more than one year prior to Sep. 6, 2012.
Brochure disclosing 1-¾" diameter Grip-Plate® Plastic washer distributed by Rodenhouse Inc. more than one year prior to Sep. 6, 2012.
Brochure disclosing 2" diameter Plasti-Grip® CBW2 washer distributed by Rodenhouse Inc. more than one year prior to Sep. 6, 2012.
Brochure disclosing 1-¾" diameter Plasti-Grip® III washer distributed by Rodenhouse Inc. more than one year prior to Sep. 6, 2012.
Brochure disclosing Plasti-Grip® PMF Plastic Masonry Fastener distributed by Rodenhouse Inc. more than one year prior to Sep. 6, 2012.
Brochure disclosing 3' diameter Grip-Lok® "Hurricane" washer distributed by Rodenhouse Inc. more than one year prior to Sep. 6, 2012.
Grid-Mate PB Mechanical Fasteners, 1999 Tool Works, Inc.
Wind-Lock catalog excerpt disclosing fastening tool system available prior to Jul. 23, 2007.
Wind-Lock catalog excerpt, disclosing fastening tool equipment available prior to Jul. 23, 2007.
Wind-Lock catalog excerpt dated 2001.
Wind-Lock catalog excerpt dated 2003.
Stuccofast brochure disclosing fastening system available prior to Jul. 23, 2007.
Performance and Selector Guide 2002, 2001 Illinois Tool Works Inc.
Web pages from ITW Commercial Construction (www.itwramset.com) showing magnetic adapter Part No. 2761910 for metal washers believed to be available more than one year prior to Mar. 15, 2013.
Images of stick pin fasteners that are adhesively attached to ducts and used to secure insulation to ducts showing construction that was in public use more than one year prior to Oct. 21, 2015.

* cited by examiner

US 9,890,807 B1

IMPALING WASHER FOR BUILDING CONSTRUCTION

CROSS REFERENCE TO RELATED APPLICATION

The present application claims priority of U.S. provisional application Ser. No. 62/244,470 filed Oct. 21, 2015, which is hereby incorporated herein by reference it its entirety.

BACKGROUND OF THE INVENTION

The present invention is directed to washers and fasteners for use in building construction, and more particularly to impaling devices for supporting wall insulation in building construction.

Fasteners and are used to secure exterior wall systems, such as wall systems in which inner wall members comprising barrier sheets are affixed over pliable building materials and secured to a rigid support. The securing of fasteners into and through the inner wall members has the potential to create leak paths for moisture, which can cause significant damage.

SUMMARY OF THE INVENTION

According to an aspect of the present invention, an impaling washer is provided for use in building construction. The washer includes an outer side, an inner side or underside disposed opposite the outer side, and an aperture disposed between the outer side and the inner side. The aperture is configured to receive a fastener to secure the inner side against a surface. A wall-engaging portion, such as a fastener, is configured to penetrate a membrane on the wall with a single puncture and fix the impaling washer to a building. An insulation-engaging portion, such as an impaler, extends opposite the wall-engaging portion and is configured to fix an inner material, such as a thermally-insulating material, for example foam sheet or panel insulation, to the impaling washer.

Furthermore, the illustrated embodiment of the impaling washer includes a sealing body with the aperture and a perimeter that is concentric with a central axis of the sealing body. There is at least one impaler extending from the sealing body, and a fastener, which has a head and a shaft extending along the central axis of the sealing body. The sealing body encompasses the head of the fastener within the aperture and the fastener further extends opposite the at least one impaler, which is radially displaced from the central axis.

In addition, a method of securing the impaling washer to the building is provided, where a substantially flat sealing body having a central axis with the impaler extending outwardly from the sealing body. A fastener extends along the central axis and away from the impaler, wherein the impaler is thermally insulated from the fastener by the sealing body. Puncturing the membrane by the fastener and securing the sealing body flush with the membrane. Furthermore, puncturing an inner material by the impaler to flushly engage the sealing body, wherein the inner material is offset from the membrane by the gap formed by a thickness of the sealing body.

The impaling washer for building construction in accordance with the present invention increases construction efficiency by reducing the number of total parts to assemble at a construction site. Furthermore, each impaling washer only punctures the sealing membrane once, rather than multiple punctures, which reduces the chances for moisture reaching the building structure. Also, the sealing body of the impaling washer offsets the building inner material, which may be insulation, from the membrane, which further reduces the likelihood that moisture will reach the insulation. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
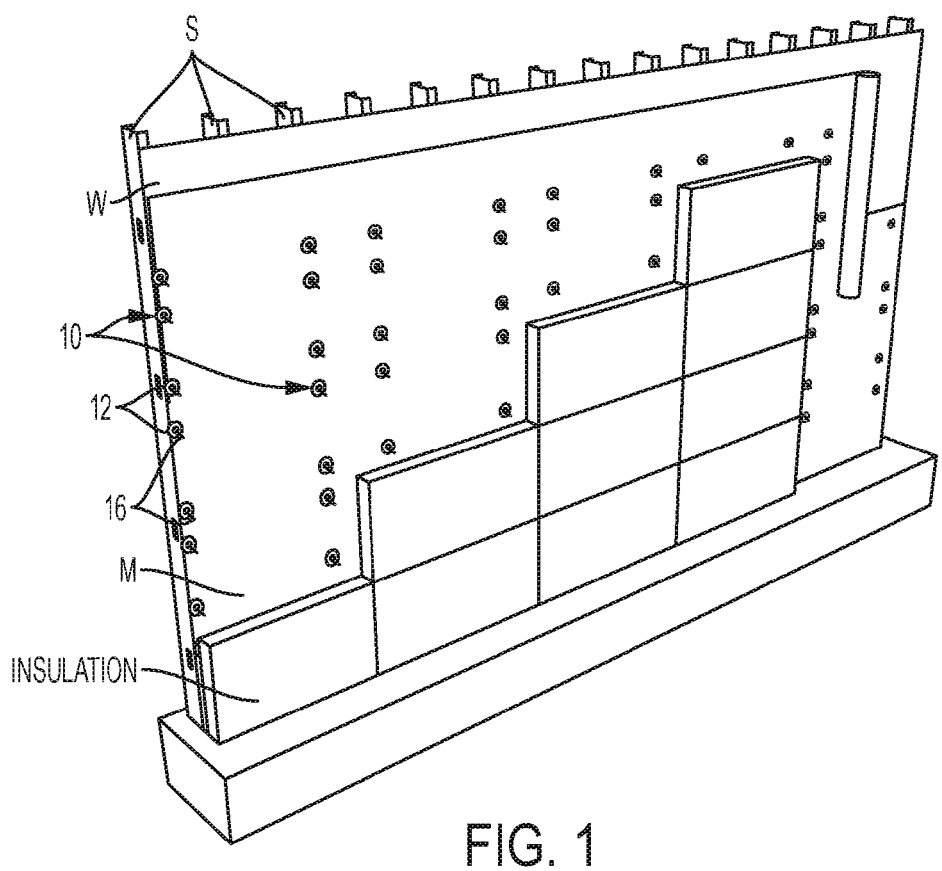
FIG. 1 is an upper perspective view of a wall section supported by frame supports on a concrete base with sections broken away to show a membrane covering the wall, impaling washers installed on the membrane along the frame supports, and rigid insulation attached to the impaling washers, in accordance to the present invention.
Figure 1A:
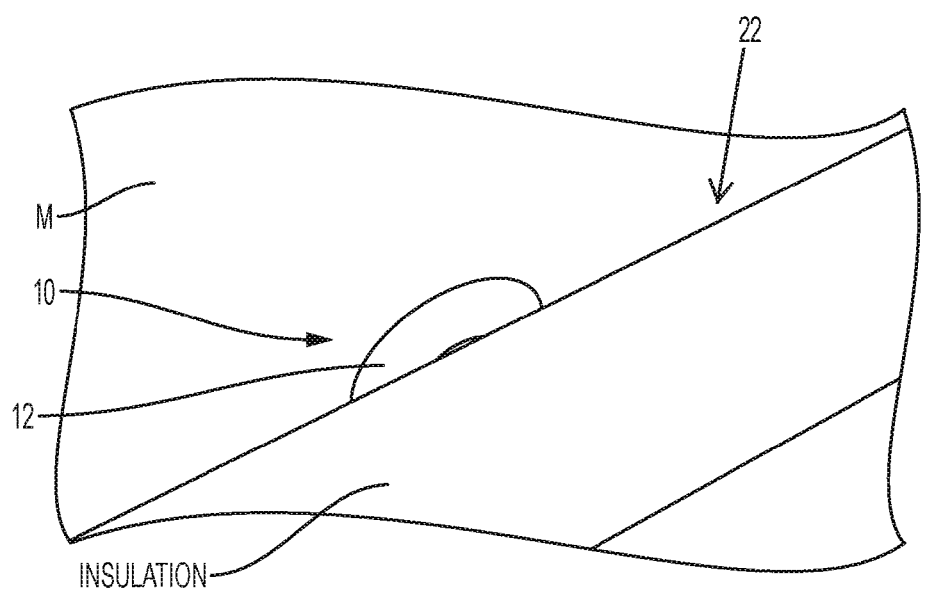
FIG. 1A is an enlarged upper perspective view of a section of FIG. 1, illustrating an impaling washer installed between a membrane and a piece of rigid insulation to form a gap.
Figure 1B:
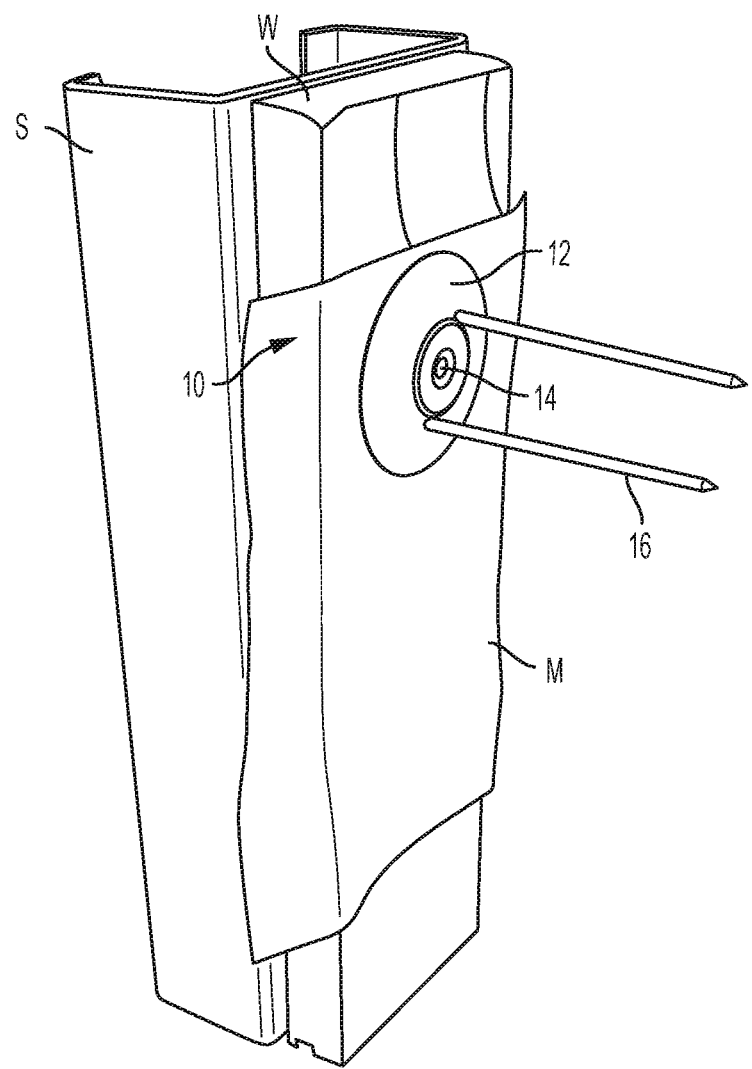
FIG. 1B is an upper perspective view of an impaling washer having multiple impalers installed on a section of a membrane covered wall.

According to an aspect of the present invention, an impaling washer 10 for use in building construction is shown in FIG. 1B including a sealing body 12, a wall-engaging portion 14, and an insulation-engaging portion 16. The wall-engaging portion 14 fixes the washer 10 to a building wall W, such as a panel or board supported by a wooden or metal stud S, where a membrane M covers the wall W. As shown in FIGS. 1-1B, the wall section has the wall W supported by a number of spaced frame supports S extending vertically from on a concrete base and the impaling washers 10 installed on the membrane M to attached along the frame supports. Also, FIG. 1 shows the rigid pieces of inner material, such as a thermally-insulating material, for example foam sheet or panel insulation, attached to the shafts or projections or impalers 16 of the impaling washers 10. The insulation-engaging portion or projection 16 fixes building insulation to the washer 10. Therefore, the washer 10, specifically the sealing body 12, fixes building insulation to a wall W through a membrane M during building construction, and provides for the mounting or affixing of insulation to the washer 10. The washer 10 provides a seal against the membrane M to prevent moisture from reaching an opening in the membrane M created by the fastener used to fix the membrane M to the building wall W. Still further, the thickness of the washer 10 provides an insulating space or gap 22 (FIG. 1A), which is generally occupied by air, between the building wall W and the insulation when the insulation is mounted or affixed to the insulation-engaging projection 16 or impaler. The insulating gap 22 acts as an additional thermal barrier and may also provide an area for drainage of condensation that may form on the membrane M.

Figure 2:
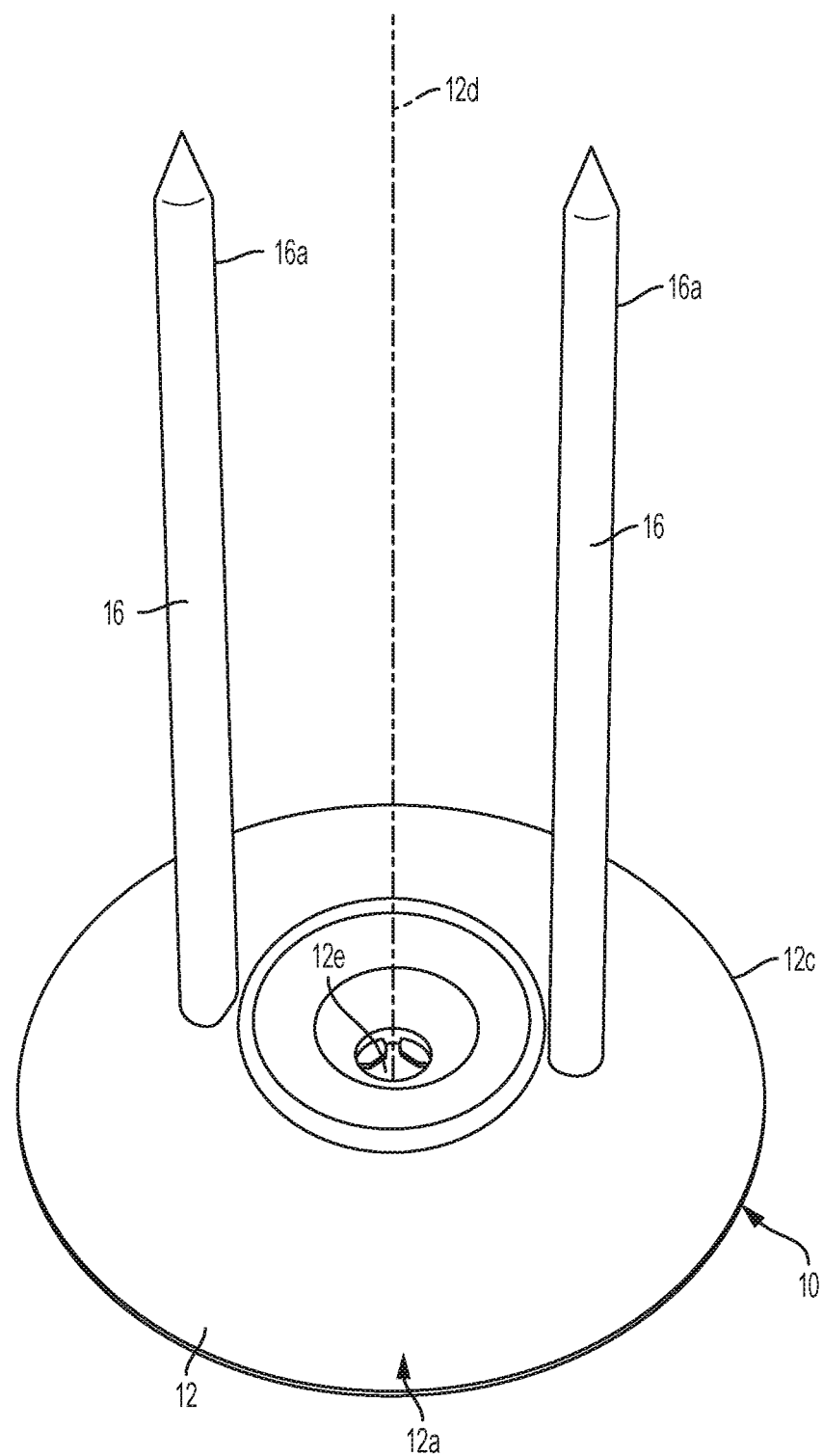
FIG. 2 is a top perspective view of the impaling washer shown in FIG. 1B.
Figure 3:
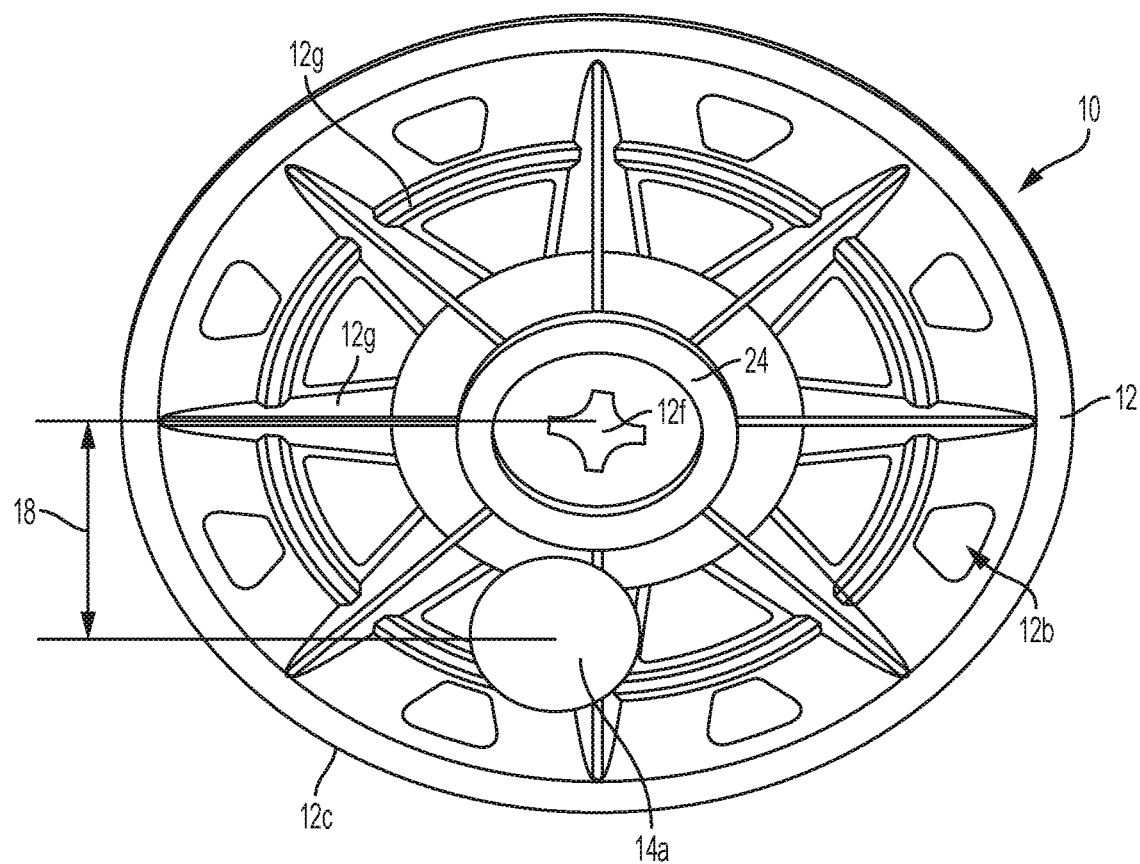
FIG. 3 is a bottom perspective view of an impaling washer with a single impaler.
Figure 4:
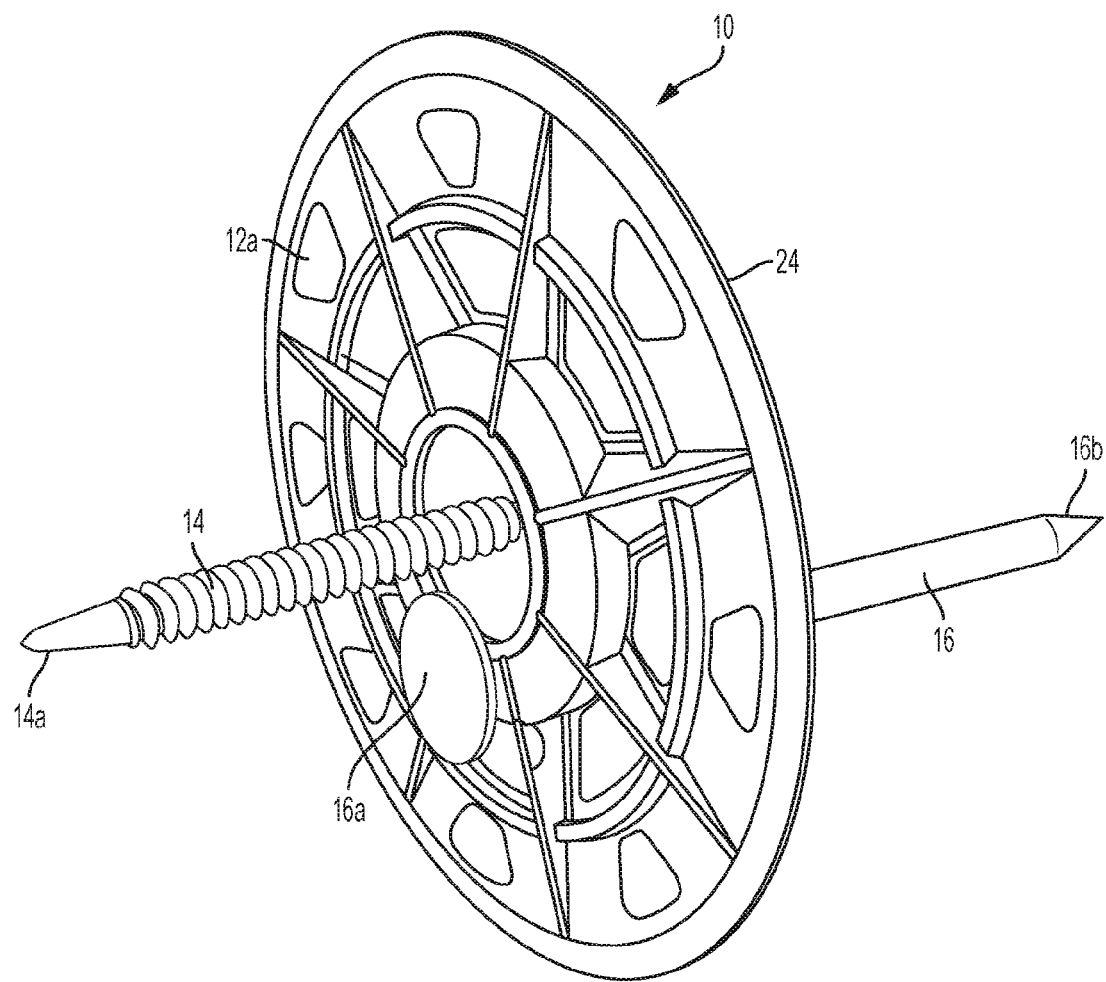
FIG. 4 is another bottom perspective view of the impaling washer of FIG. 3, shown with a fastener extending through a central hole.
Figure 5:
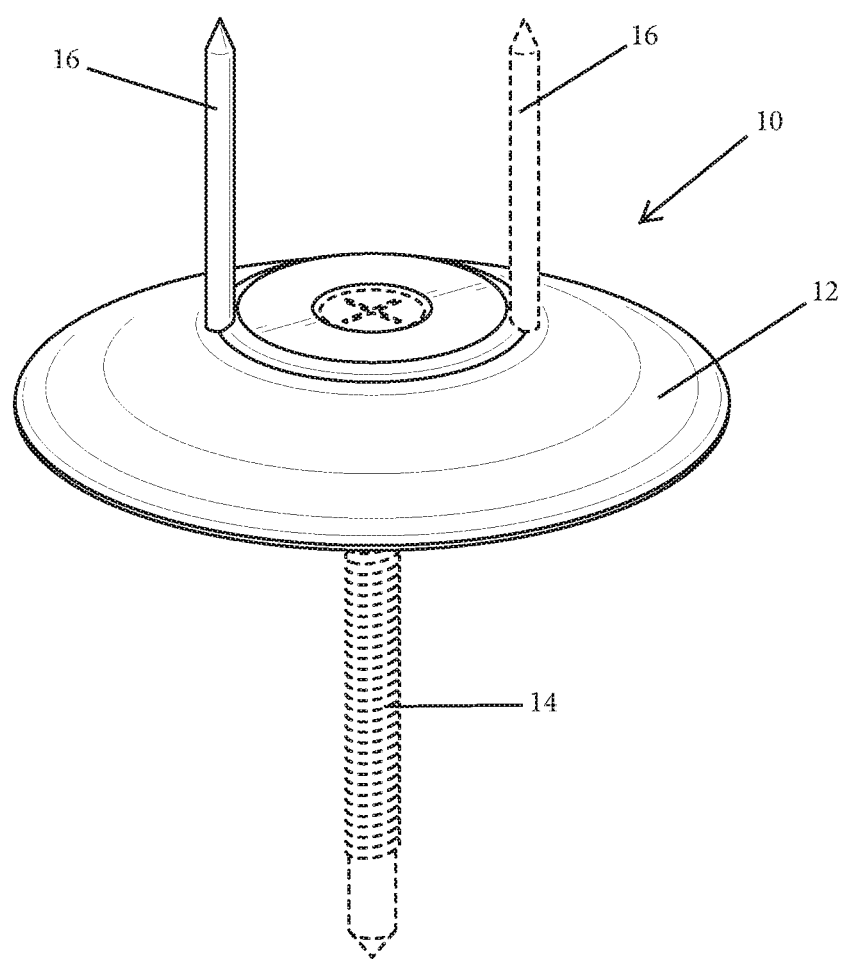
FIG. 5 is a top perspective view of an impaling washer with one of the impalers and a fastener illustrated in phantom lines.
Figure 6:
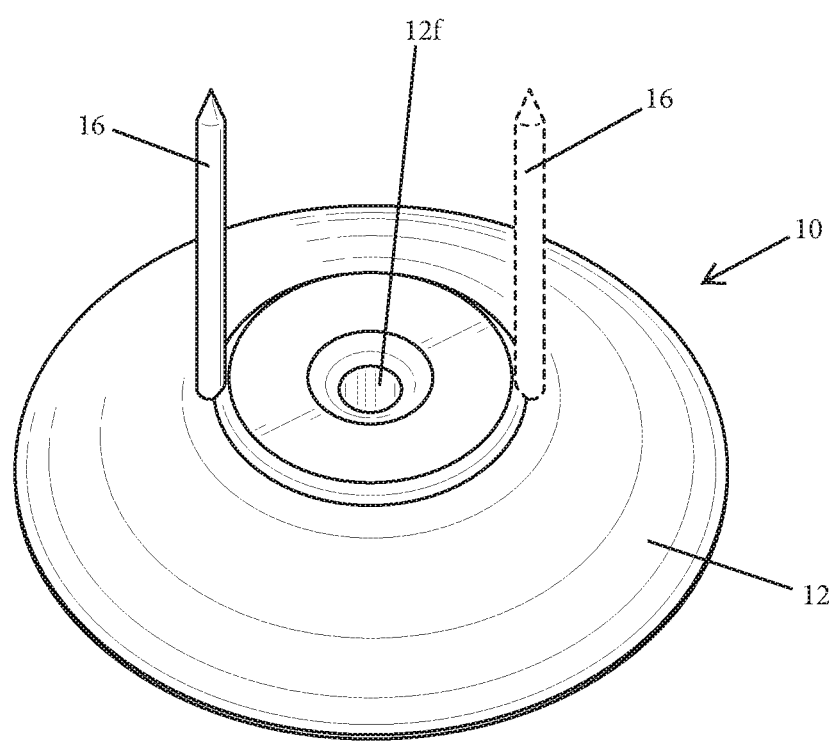
FIG. 6 is a top perspective view of the impaling washer of FIG. 5, shown with the fastener removed.
Figure 7:
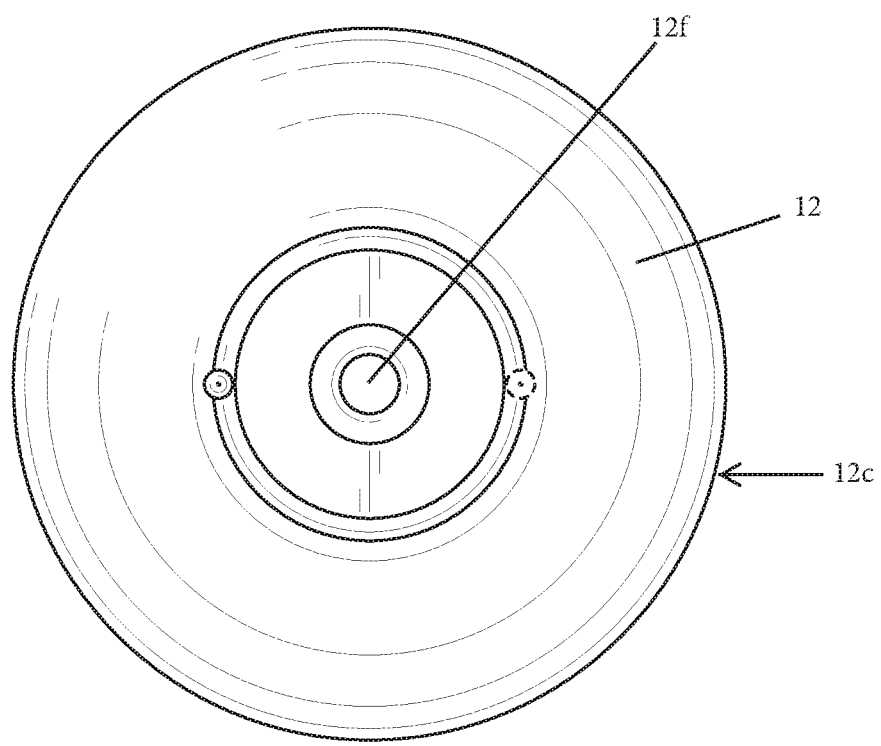
FIG. 7 is a top plan view of the impaling washer of FIG. 6.
Figure 8:
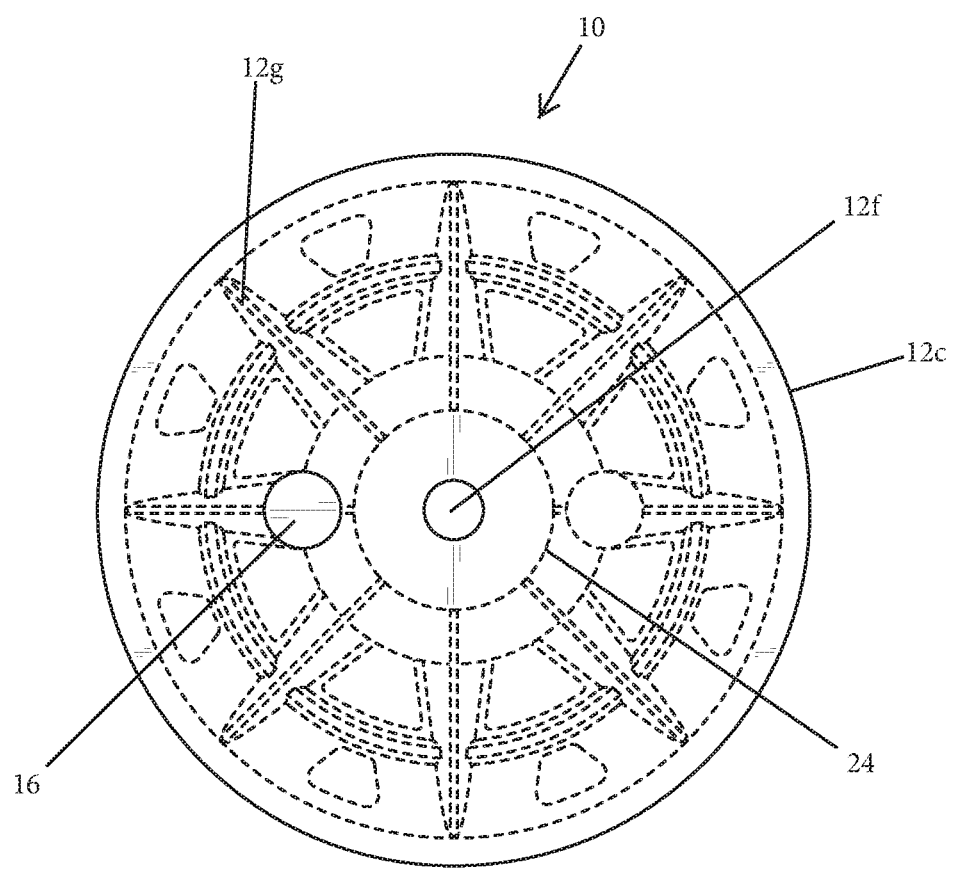
FIG. 8 is a bottom plan view of the impaling washer of FIG. 6, shown with reinforcing members illustrated in phantom lines.

Referring to the FIGS. 2-16, specifically FIGS. 2-4, the sealing body 12 includes an outer side 12a, an inner side or underside 12b disposed opposite the outer side 12a, and an aperture 12f disposed between the outer side 12a and the underside 12b. The washer 10, specifically the sealing body 12, including the outer side 12a and underside 12b, generally has a circular sealing edge or perimeter 12c with a substantially convex shape forming a hump 20. The convex shape of the sealing body 12 generally tapers from a central portion near the aperture to the circular perimeter. Therefore, the outer side 12a is generally rounded, while the underside 12b is more generally flat, or may be concave, and includes reinforcing members 12g spanning over the interior concave shape. Underside 12b may alternatively be shaped with an increased concave shape corresponding to the outer side 12a in additional embodiments. In the illustrated embodiment, the washer 10 further includes the hump 20 or integral protuberance extending from the outer side 12a such as for mating with a locating tool, as is disclosed in U.S. Pat. No. 9,309,915, which is hereby incorporated herein by reference.

Figure 9:
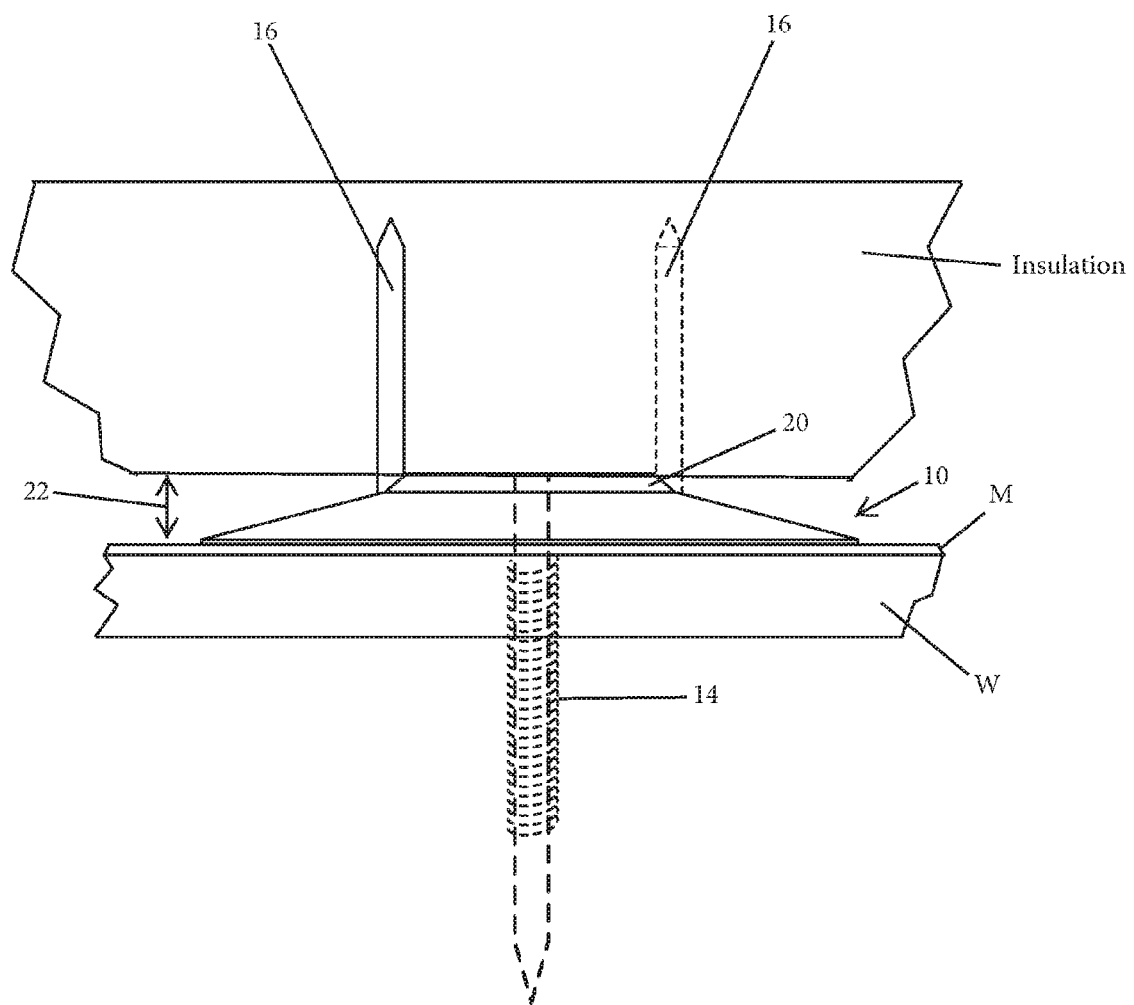
FIG. 9 is a side cross-sectional view of the impaling washer of FIG. 5, shown with the impalers engaged in insulation and the fastener securing the impaling washer through a membrane and a building wall.
Figure 10:
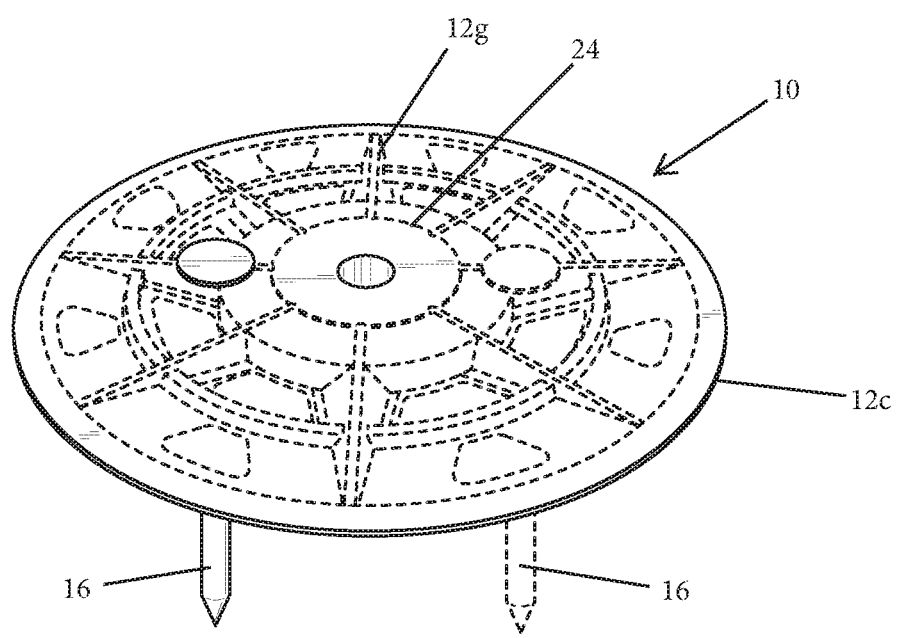
FIG. 10 is a bottom perspective view of the impaling washer of FIG. 6.
Figure 11:
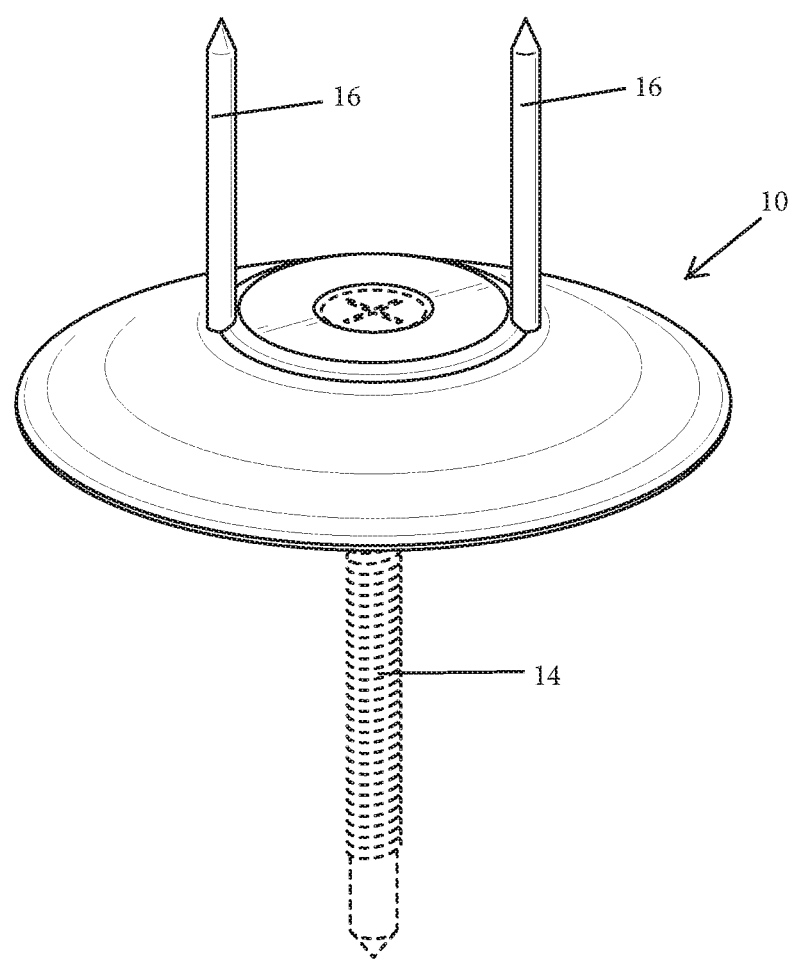
FIG. 11 is a top perspective view of an impaling washer with multiple impalers, and having a fastener illustrated in phantom lines.
Figure 12:
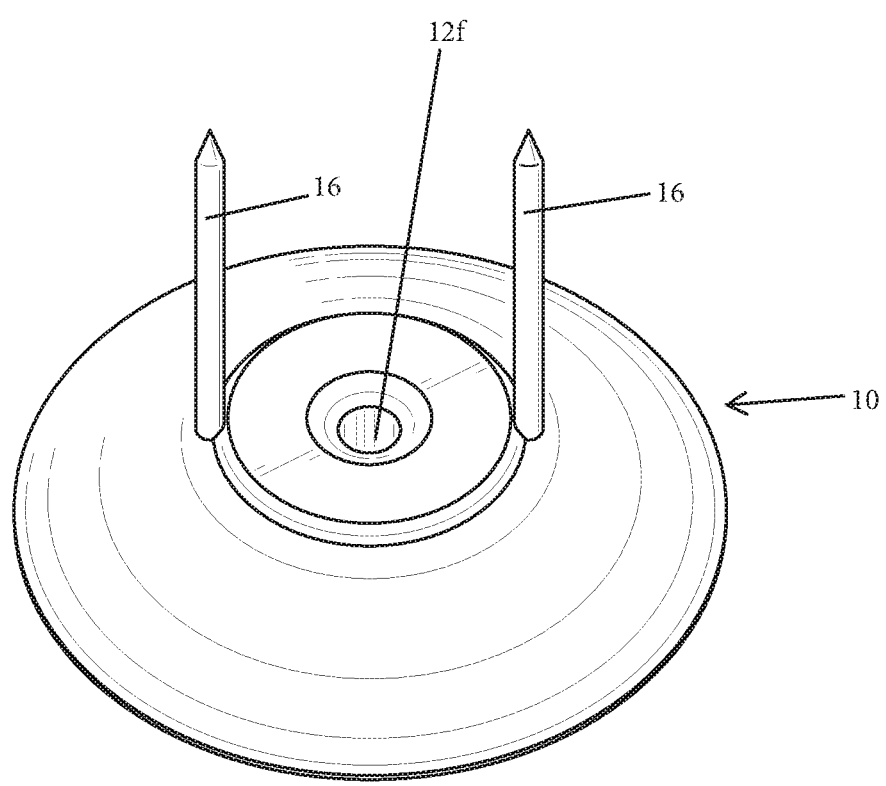
FIG. 12 is a top perspective view of the impaling washer of FIG. 11, shown with the fastener removed.
Figure 13:
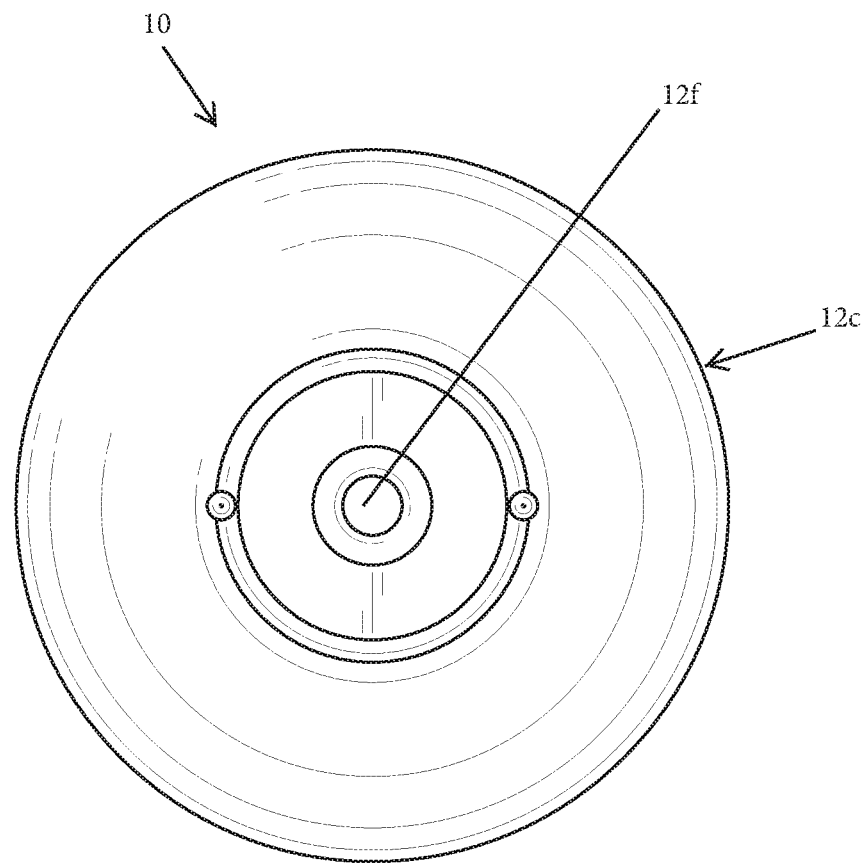
FIG. 13 is a top plan view of the impaling washer of FIG. 12.
Figure 14:
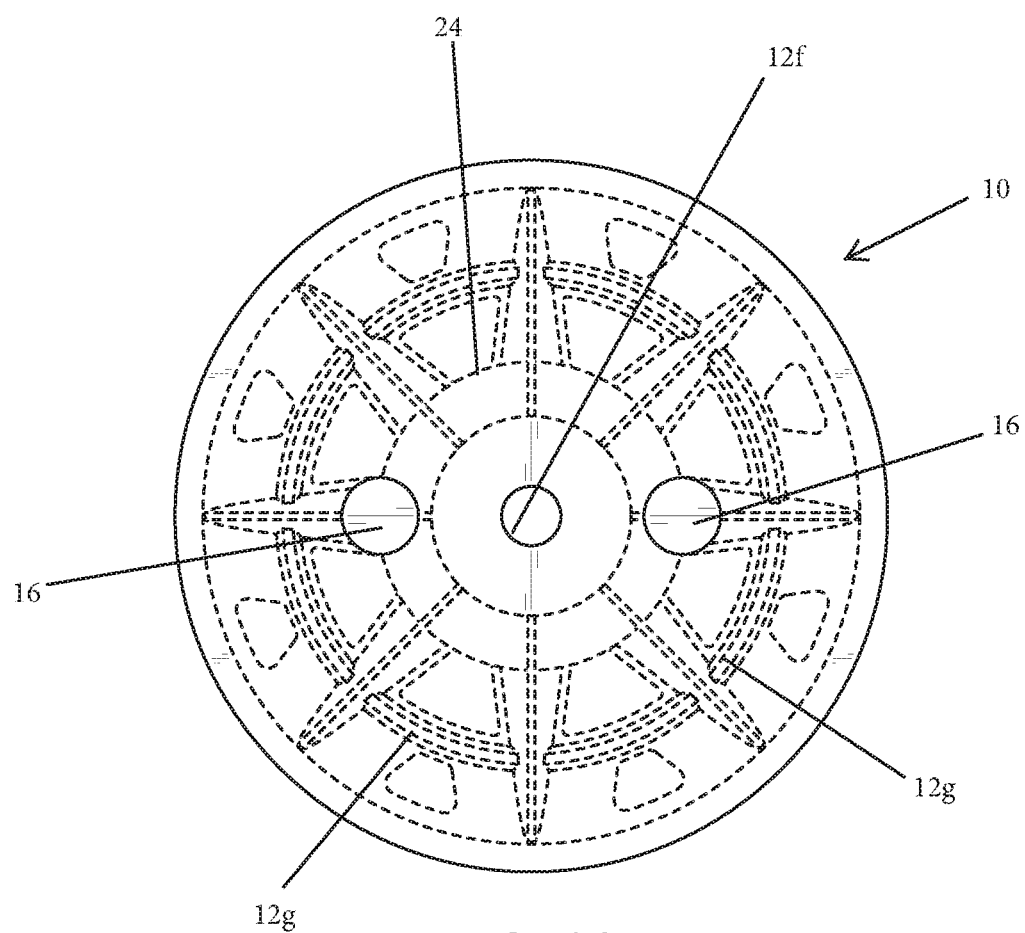
FIG. 14 is a bottom plan view of the impaling washer of FIG. 12, shown with reinforcing members illustrated in phantom lines.
Figure 15:
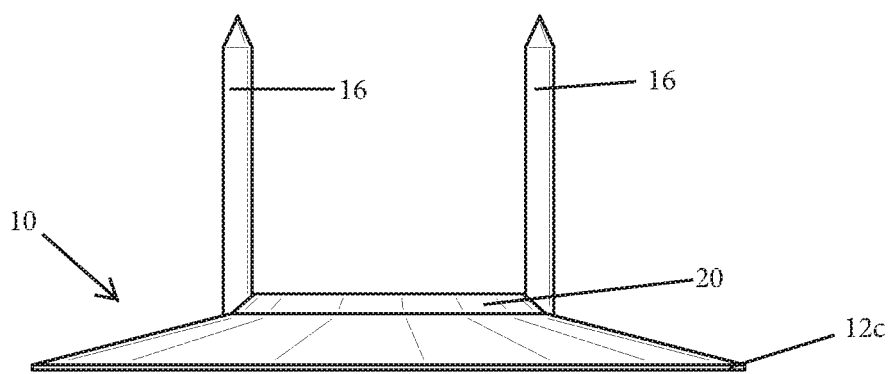
FIG. 15 is a side elevation view of the impaling washer of FIG. 12.
Figure 16:
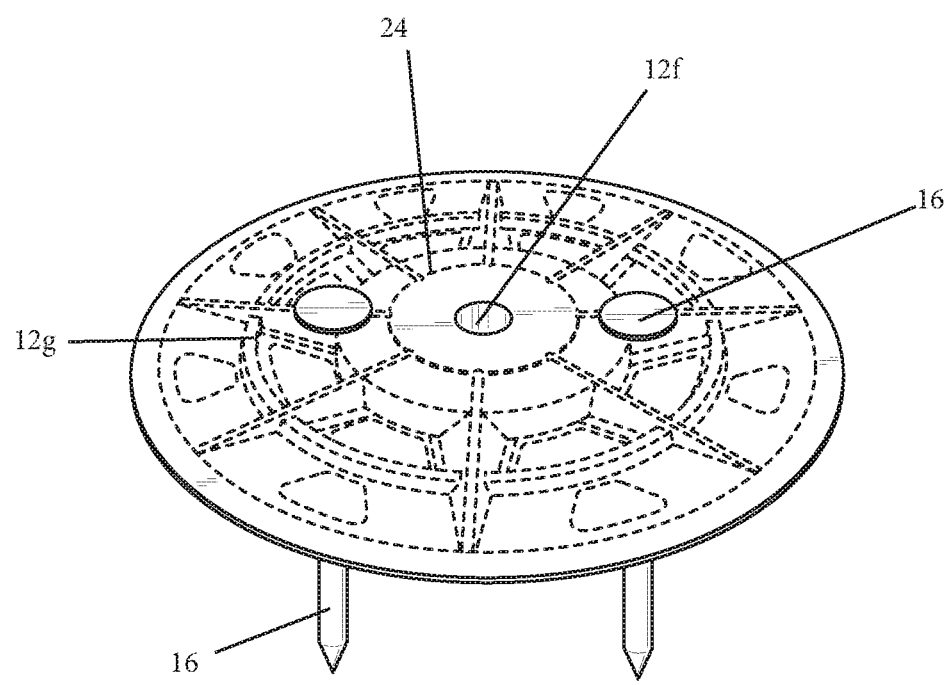
FIG. 16 is a bottom perspective view of the impaling washer of FIG. 12, shown with reinforcing members illustrated in phantom lines.

Furthermore, the outer side 12a has a substantially concave center 12e within the convex shape, as shown in FIG. 2, which forms the insulating gap 22 between the insulation and the membrane M (see FIG. 9). The membrane may be building wrap material or liquid applied weather barrier. For example, the concave center 12e has a substantially circular perimeter that is concentric with the sealing perimeter 12c of the washer 10. In the illustrated embodiment, the outer side 12a and the underside 12b are manufactured from a material with thermally insulating properties, such as plastic. Therefore, the thermally insulating properties and the gap 22 substantially thermally insulate the insulation from the membrane M. The sealing body 12 has an aperture 12f and a perimeter 12c that is generally concentric with a central axis 12d of the sealing body 12. The aperture 12f is configured to receive a fastener 14. For example, the aperture 12f receives the wall-engaging portion 14, as described below, which secures the underside 12b against a surface, such as a wall W or a building structure. Alternative embodiments are manufactured from other thermally insulating materials, such as rubber, or materials with thermally conducting properties, such as metals.

In the illustrated embodiment and shown in FIGS. 3, 8, 10, 14, and 16, the underside 12b of the washer 10 includes a plurality of members 12g. The plurality of reinforcing members 12g, such as tapered ribs or concentric rings, are configured to add structural rigidity to the washer 10. For example, the plurality of reinforcing members 12g are substantially radially aligned from the aperture 12f. A person having ordinary skill in the art understands that the reinforcing members 12g may have varied orientations, for example, the members may be concentrically or laterally aligned, or a combination of orientations.

The wall-engaging portion 14 is configured to penetrate the membrane M with a single puncture and fix the washer 10 to the building, such as in FIGS. 1, 4, 5, and 11. For example, the wall-engaging portion 14 is a fastener 14, such as a screw or nail, with a shaft 14b that fits through the aperture 12f and a head 14a. Furthermore, the head 14a of the fastener 14 is set within the washer 10, such that the washer 10 is fixed flush to the wall W and the head 14a does not touch the membrane M, insulation, or the wall W. In an alternative embodiment, the fastener 14 is integral to the underside 12b, for example, if the sealing body 12 and the fastener 14 are manufactured from a single piece of material (not shown).

Referring to FIGS. 1, 2, and 11-16, the insulation-engaging portion 16 includes at least one impaler 16, which is a fastener, such as a nail, extending from the sealing body 12. The impaler 16 has a first end 16a encompassed within the sealing body 12 and a second end 16b extending along the central axis 12d of the sealing body 12. Specifically, the first end 16a of the impaler 16 is radially displaced from the central axis 12d of the sealing body 12 such that the first end 16a of the impaler 16 is radially outward from the concave center 12e of the sealing body 12.

The impaler 16 is configured to fix an inner material, such as building insulation, to the washer 10, where the insulation may be a rigid foam material or a flexible insulation, such as faced or unfaced fiberglass insulation. In the illustrated embodiment, for example, the impaler 16 extends outward from the sealing body 12, opposite the fastener 14. However, the impaler 16 may angularly extend from the sealing body 12. For example, an angled impaler 16 may be installed to have a slightly upward angle for providing additional support to insulation disposed thereon. The insulation-engaging portion 16 may include more than one nail that is substantially uniformly dispersed on the outerside 12a. For example, in an embodiment in which the insulation-engaging portion 16 has two nails, the nails are disposed on opposing sides of the concave center 12e, as shown in FIG. 2. Furthermore, the impaler 16 is substantially thermally insulated from the aperture 12f, for example, by a radial offset 18. However, in an alternative embodiment, the insulation engaging portion or shafts 16 are manufactured integrally to the outer side 12a of the sealing body 12. For example, the body 12 and impalers may be integrally molded together from plastic. In the illustrated embodiment the impalers 16 may be configured to extend approximately 1.5 inches to 2.75 inches from the outer surface of the sealing body 12. The length of the impalers 16 may be selected based on, for example, the type and associated thickness of the insulation to be supported. That is, the size is selected to provide sufficient support of the insulation without extending beyond the supported insulation, which may otherwise interfere with the outer building materials disposed over the insulation.

The membrane M is generally a water-resistant material. Specifically, the membrane M is a water-resistant membrane that inhibits moisture from crossing the membrane M. In the illustrated embodiment the membrane M is plastic, but may also be rubber or coated-fabric materials. As a further example, the membrane M will inhibit moisture from an exterior of the building structure from reaching the insulation in an interior of the building. A person having ordinary skill in the art understands the membrane M may be many materials and thicknesses.

Puncturing the membrane M with the fastener 14 may allow moisture through the membrane M. However, the sealing body 12 is fixed flush to the membrane M to form a seal and the at least one impaler 16 does not engage the membrane M. Specifically, the outer perimeter 12c seals against the membrane M to inhibit moisture from passing there through. Still further, washer 10 includes an inner seal portion 24 that, upon fastener 14 affixing washer 10 to wall W, washer 10 flexes whereby inner seal portion 24 additionally engages wall W to provide a further seal to inhibit any moisture from reaching the puncture in membrane M created by fastener 14. Therefore, the washer 10 inhibits moisture passing through the membrane M. Furthermore, the washer 10 substantially thermally insulates the membrane M from the insulation because the head 14a of the fastener 14 is encompassed by the concave center 12e within the convex shape of the washer 10, including the hump 20; therefore, the fastener 14 does not engage the insulation because of the gap 22 between the insulation and the membrane M. Furthermore, the at least one impaler 16, including the first end 16a encompassed by the sealing body 12, is radially offset from the fastener 14 and does not engage the membrane M. Therefore, the insulation is substantially thermally insulated from the membrane M.

According to an aspect of the present invention, a method of securing the impaling washer 10 to a wall W includes providing the substantially flat sealing body 12. The sealing body 12 includes the central axis 12d with impaler 16 extending outwardly from the sealing body 12 and the fastener 14 extending along the central axis 12d and away from the impaler 16. The fastener 14 may further be substantially thermally insulated from the impaler 16 by forming gap 22 with washer 10, including hump 20. Providing the substantially flat sealing body 12 with the central axis 12d by the impaler 16 may further include offsetting the impaler 16 from the central axis 12d, for example, to substantially thermally insulate the impaler 16 from the fastener 14.

Puncturing the water-resistant membrane M by the fastener 14 and securing the sealing body 12 flush with the membrane M. Specifically, in the illustrated embodiment puncturing the membrane M includes orienting the central axis 12d of the washer 10 to be vertically above the impaler 16. Puncturing an inner material, such as building insulation, by the impaler 16 to flushly engage the sealing body 12 to the inner material, which is offset from the membrane M. Specifically, sealing the outer perimeter 12c against the membrane M to inhibit moisture from passing there through. Still further, sealing inner seal portion 24 of washer 10 that, upon fastener 14 affixing washer 10 to wall W, further sealing washer 10 against wall W by flexing inner seal portion 24 against wall W to inhibit any moisture from reaching the puncture in membrane M created by fastener 14. In one embodiment, the membrane M is punctured by the fastener 14 by operating a washer gun (not shown) to secure the sealing body 12 flush with the membrane M.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An impaling washer for use in building construction, said impaling washer comprising:
    a sealing body having an aperture configured to receive a fastener that penetrates a membrane covering a wall and secures to the wall;
    wherein said sealing body comprises an inner surface portion surrounding said aperture that is configured to secure and seal against an outer surface of the membrane;
    at least one impaler extending from an outer side of said sealing body and configured to extend away from the wall;
    wherein said at least one impaler is configured to engage a thermally-insulating material and hold the thermally-insulating material at said outer side of said sealing body; and
    wherein said sealing body comprises a thickness configured to form a gap between the thermally-insulating material and the outer surface of the membrane for drainage along the outer surface of the membrane; and
    wherein said at least one impaler comprises at least one nail extending through said sealing body with a head of said nail disposed at an inner side of said sealing body and a shank of said nail extending from said outer side of said sealing body.

2. The impaling washer of claim 1, wherein said at least one impaler is displaced on said outer side of said sealing body away from said aperture.

3. The impaling washer of claim 1, wherein said outer side of said sealing body has a substantially convex shape that tapers from a central portion defining said thickness to a perimeter of said sealing body.

4. The impaling washer of claim 1, wherein said outer side of said sealing body comprises a recessed area at said aperture for encompassing a head of the fastener within said thickness of said sealing body, such that said sealing body is secured between the head of the fastener and the membrane.

5. The impaling washer of claim 1, wherein said sealing body comprises a perimeter concentric with said aperture extending through said sealing body.

6. The impaling washer of claim 1, wherein said inner surface portion has a substantially flat surface for contacting the outer surface of the membrane.

7. The impaling washer of claim 1, wherein an inner side of said sealing body has a concave shape with a plurality of reinforcing members.

8. The impaling washer of claim 1, comprising a pair of impalers extending generally parallel relative to each other away from said outer side of said sealing body and configured to extend generally perpendicularly away from the outer surface of the membrane.

9. The impaling washer of claim 1, wherein said sealing body comprises a thermally-insulating polymer material.

10. An impaling washer and fastener for use in building construction comprising:
 a sealing body having an outer side and an underside opposite said outer side with said outer side having a convex shape that tapers from a central portion to a perimeter of said sealing body, and with said underside defining a planar profile;
 wherein said sealing body includes an aperture disposed at said central portion that is concentric with said perimeter of said sealing body;
 wherein said aperture is configured to receive a fastener with said fastener being separate from said sealing body and having a shaft extending from said underside when said fastener is inserted through said sealing body, wherein said fastener is configured to secure said sealing body to a wall; and
 wherein said sealing body includes an elongate and straight impaler extending vertically upwards from said outer side of said sealing body with said impaler having a pointed end opposite said sealing body and configured to extend away from the wall when said underside is placed against the wall to fix an insulating material to said sealing body, and wherein said impaler is radially offset from an axis of said aperture.

11. The impaling washer of claim 10, wherein said underside of said sealing body includes an inner surface portion surrounding said aperture that is configured to secure and seal against an outer surface of a membrane covering the wall.

12. The impaling washer of claim 11, wherein said sealing body comprises a thickness configured to form a gap between the insulating material and the outer surface of the membrane for drainage along the outer surface of the membrane.

13. The impaling washer of claim 10, wherein said sealing body is configured to encompass a head of said fastener within said aperture.

14. The impaling washer of claim 10, wherein said sealing body comprises a thermally-insulating polymer material that thermally insulates said impaler from said fastener that extends through said aperture.

15. The impaling washer and fastener of claim 10, wherein said sealing body includes another elongate and straight impaler extending vertically upwards from said outer side of said sealing body and having a pointed end opposite said sealing body and configured to extend away from the wall when said underside is placed against the wall.

16. A method of insulting an exterior side of a wall of a building, said method comprising:
 providing an impaling washer having a sealing body and an impaler extending from said sealing body;
 engaging a fastener through an aperture disposed at a central portion of said sealing body that tapers to a perimeter of said sealing body;
 penetrating a membrane covering a wall with a shank of said fastener to secure said sealing body against said membrane covering said wall, wherein said impaler extends perpendicularly away from said wall;
 installing an insulating material on said impaling washer by puncturing said insulating material against said impaler, wherein said insulating material is spaced from said membrane covering said wall by a thickness of said sealing body; and
 wherein said impaler is offset from a central axis of said sealing body, and wherein said aperture is concentric with said central axis, and wherein said impaler comprises a nail extending through said sealing body with a head of said nail disposed at an inner side of said sealing body and a shank of said nail extending from an outer side of said sealing body.

17. The method of claim 16, wherein puncturing said membrane further comprises orienting said fastener generally perpendicular to said wall.

18. The method of claim 16, wherein puncturing said membrane by said fastener further comprises operating a washer gun to secure said sealing body flush with said membrane.

19. The method of claim 16, wherein an outer side of said sealing body comprises a recessed area at said aperture for encompassing a head of said fastener within said thickness of said sealing body, such that said sealing body is secured between said head of said fastener and said membrane, and wherein an inner side of said sealing body comprises a substantially flat surface for contacting and sealing against said membrane.

* * * * *